EJECTOR MECHANISM FOR PATTERN PLATES

Inventors
Gwynne Jenkins
George William Taylor
By Richardson, David and Norton
Their Attorneys Inventors
Gwynville Jenkins
By George William Taylor
Richardson, David and Norton
their Attorneys.

Inventors
Gwynville Jenkins
George William Taylor
By Richardson, David and Nordon
their Attorneys Inventor
Gwynville Jenkins
By George William Taylor
Richardson, David and Nordon
their Attorneys Inventor
Gwynville Jenkins
George William Taylor
By Richardson, David and Nordon
their Attorneys.

June 26, 1956 G. JENKINS ET AL 2,751,645

EJECTOR MECHANISM FOR PATTERN PLATES

Filed Sept. 3, 1952 6 Sheets-Sheet 6

Inventors
Gwynville Jenkins
George William Taylor
By Richardson, David and Nordon
their Attorneys 2,751,645

EJECTOR MECHANISM FOR PATTERN PLATES

Gwynville Jenkins, Staines, and George William Taylor, The Causeway, Staines, England, assignors, by mesne assignments, to Polygram Casting Company Limited, London, England Application September 3, 1952, Serial No. 307,646

Claims priority, application Great Britain August 8, 1952

8 Claims. (Cl. 22—20)

Figure 1:
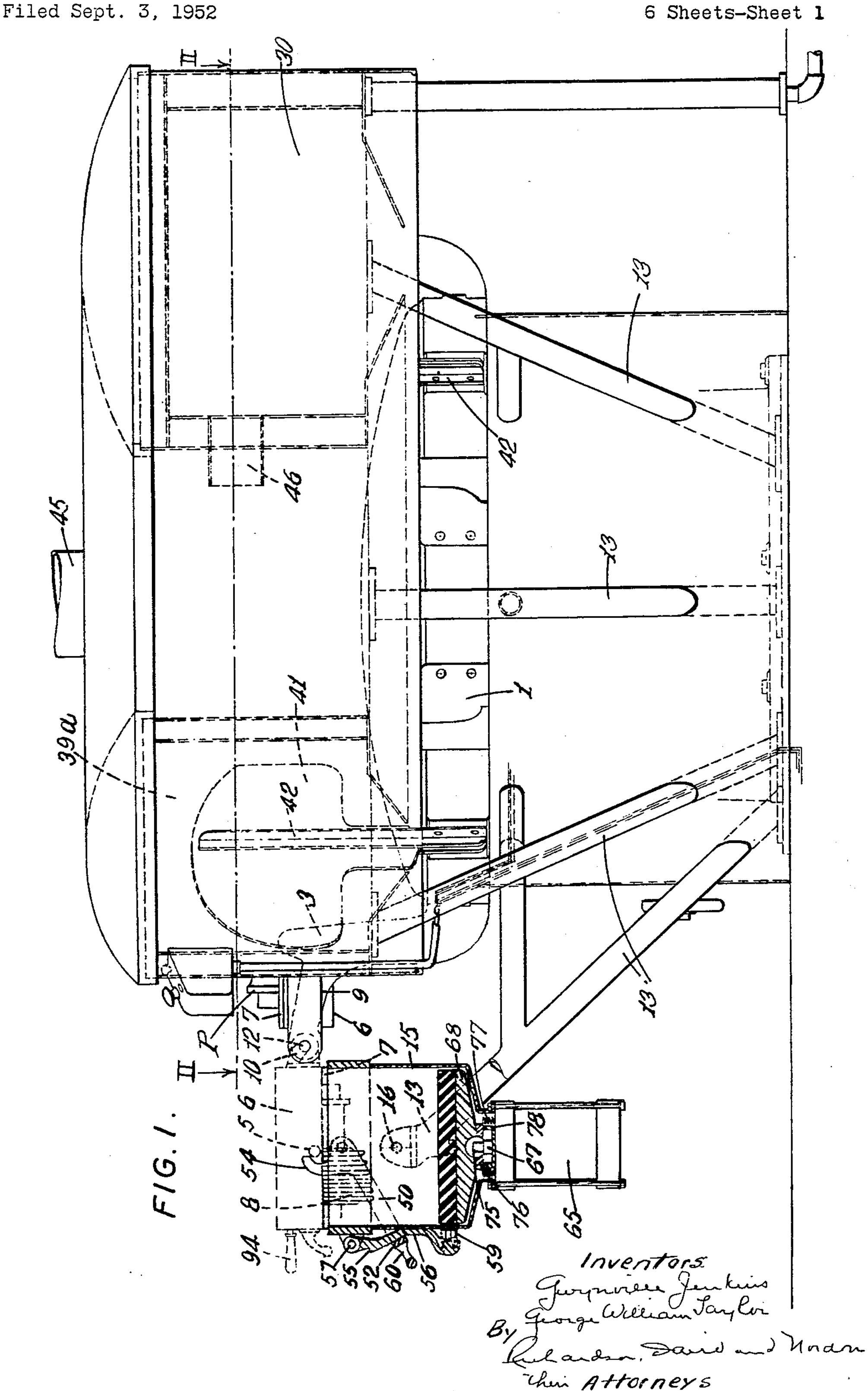

This invention relates to apparatus for stripping or ejecting from a pattern plate a moulded article such as a casting mould which has been produced by coating the pattern plate with a dry finely divided moulding material comprising a finely divided granular material such as sand and a relatively small quantity of a hardenable binder such as thermo-setting resin also in dry finely divided form.

Such casting moulds are thin walled in relation to their overall dimensions and capacity and in the production of such moulds the moulding mixture is applied to a heated pattern, the heat from which softens the resin whereby a relatively thin coating of the moulding mixture is formed on the pattern. Within a few seconds this coating partially sets and its setting may be completing either by the heat of the pattern or by further heating in an oven. After the setting is complete the coating is stripped from the pattern and constitutes a half-mould, the pattern being initially coated with a substance, such as a wax, which facilitates the stripping.

The invention has for its object to provide an improved means for stripping or ejecting from the pattern plate the moulds or other articles formed thereon which will facilitate the mass production of such moulds or other articles.

Apparatus according to the present invention comprises, in combination, a pattern support, ejector elements movable through the pattern support to eject a cured coating from the pattern, and means for actuating said ejector elements.

According to a feature of the invention the apparatus may comprise in combination, a mounting for a pattern-carrying plate, ejector elements disposed within said mounting, means for attaching a pattern-carrying plate to said mounting with holes in said plate in registration with said ejector elements, and means in said mounting for reciprocating said ejector elements towards and away from said plate, when attached to the mounting.

According to a further feature of the invention the apparatus preferably includes means for first retracting the ejector elements below the surface of the pattern support and then moving them in the reverse direction to a greater extent so that they perform the ejection operation. By this initial retraction of the ejector elements the moulded article is freed from any adherence to the operative surfaces of the ejector elements in preparation for the ejection operation itself.

In order to enable the apparatus, according to the invention, to be applied to the mass production of moulded articles, the pattern support, ejector elements, and an actuator therefor may be mounted in a housing an a unitary structure for attachment to a conveyor means such as a rotating table which brings the pattern support successively from a heating means to a coating means and thence to he heating means again, in which case the actuator may be operated to effect the ejecting operation by a fixed member disposed in its path as the conveyor means moves said unitary structure to the coating means from a point within the heating means.

Figure 2A:
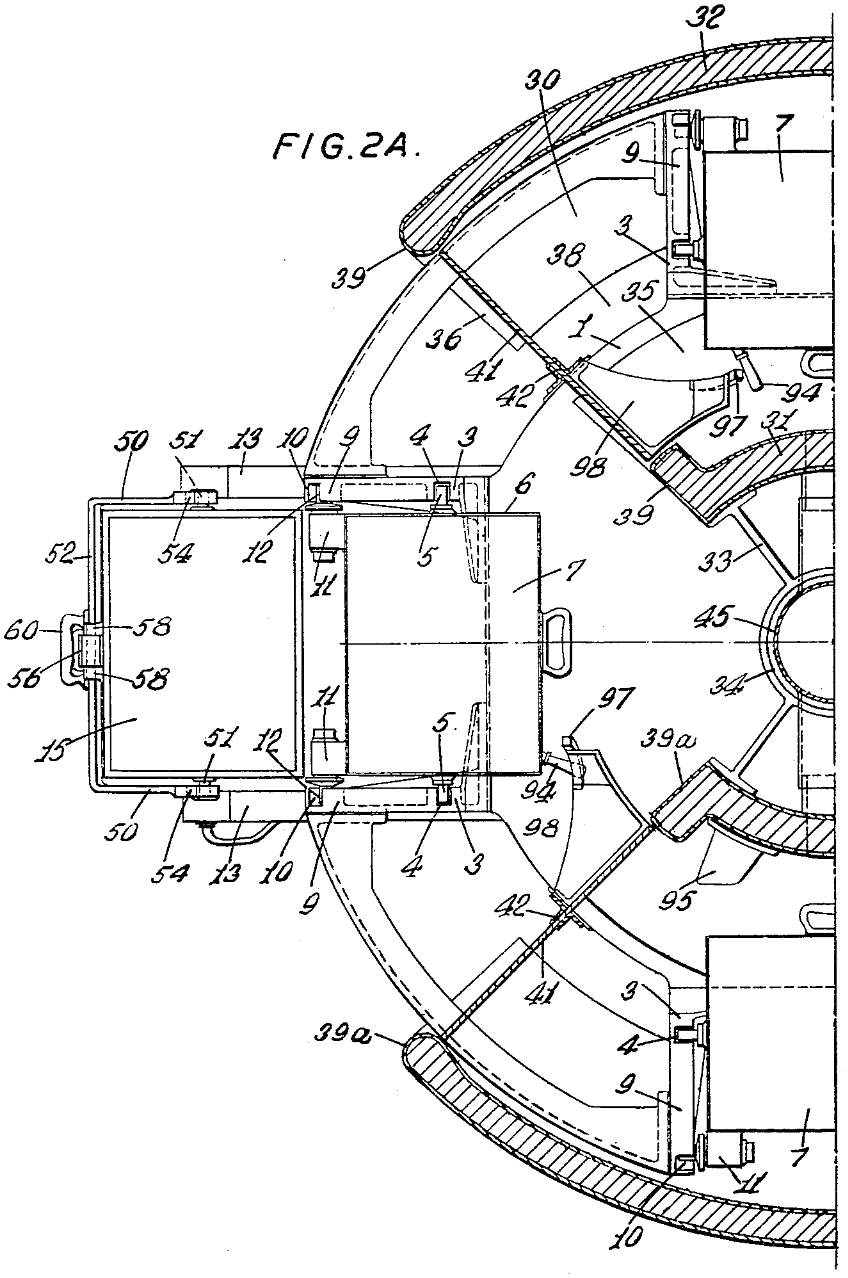
Figure 2B:
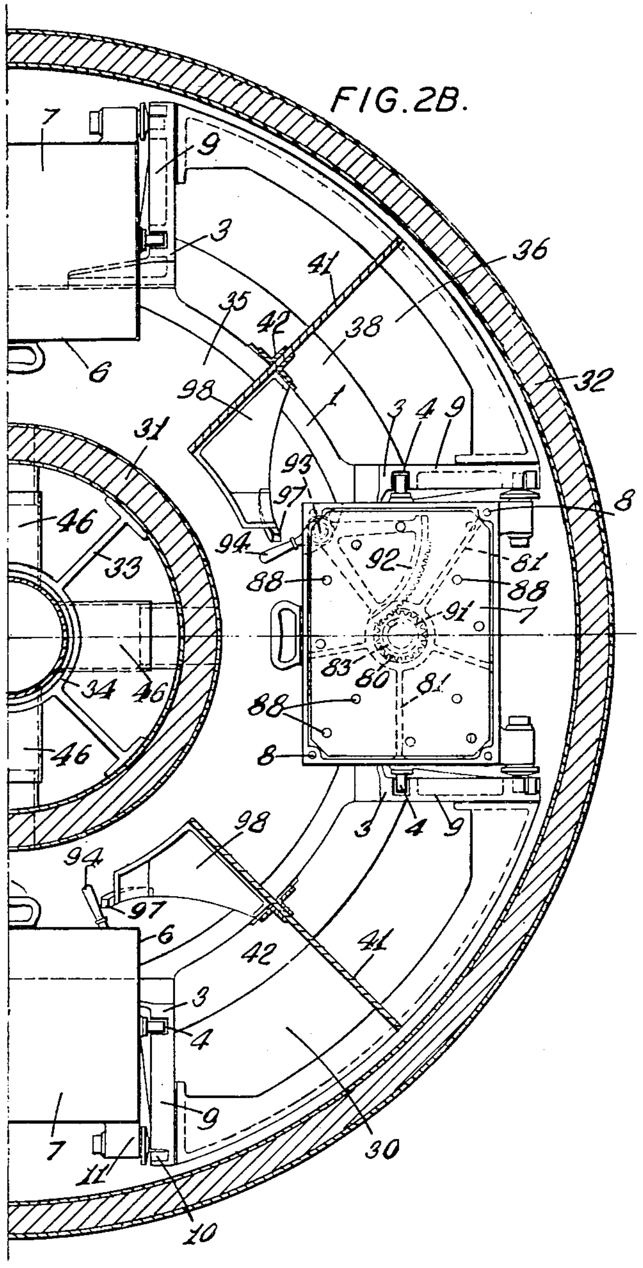
Figure 3:
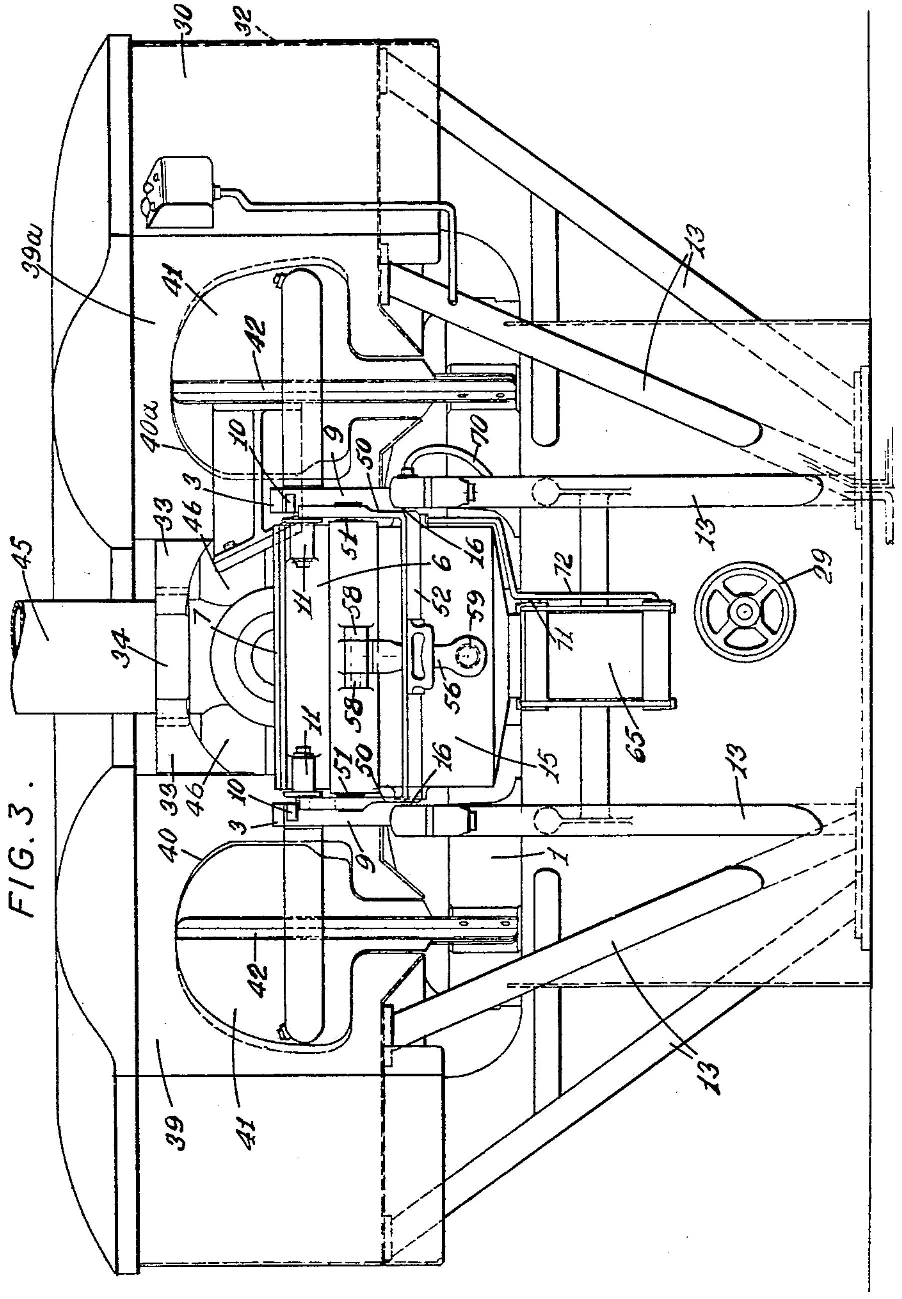
Figure 4:
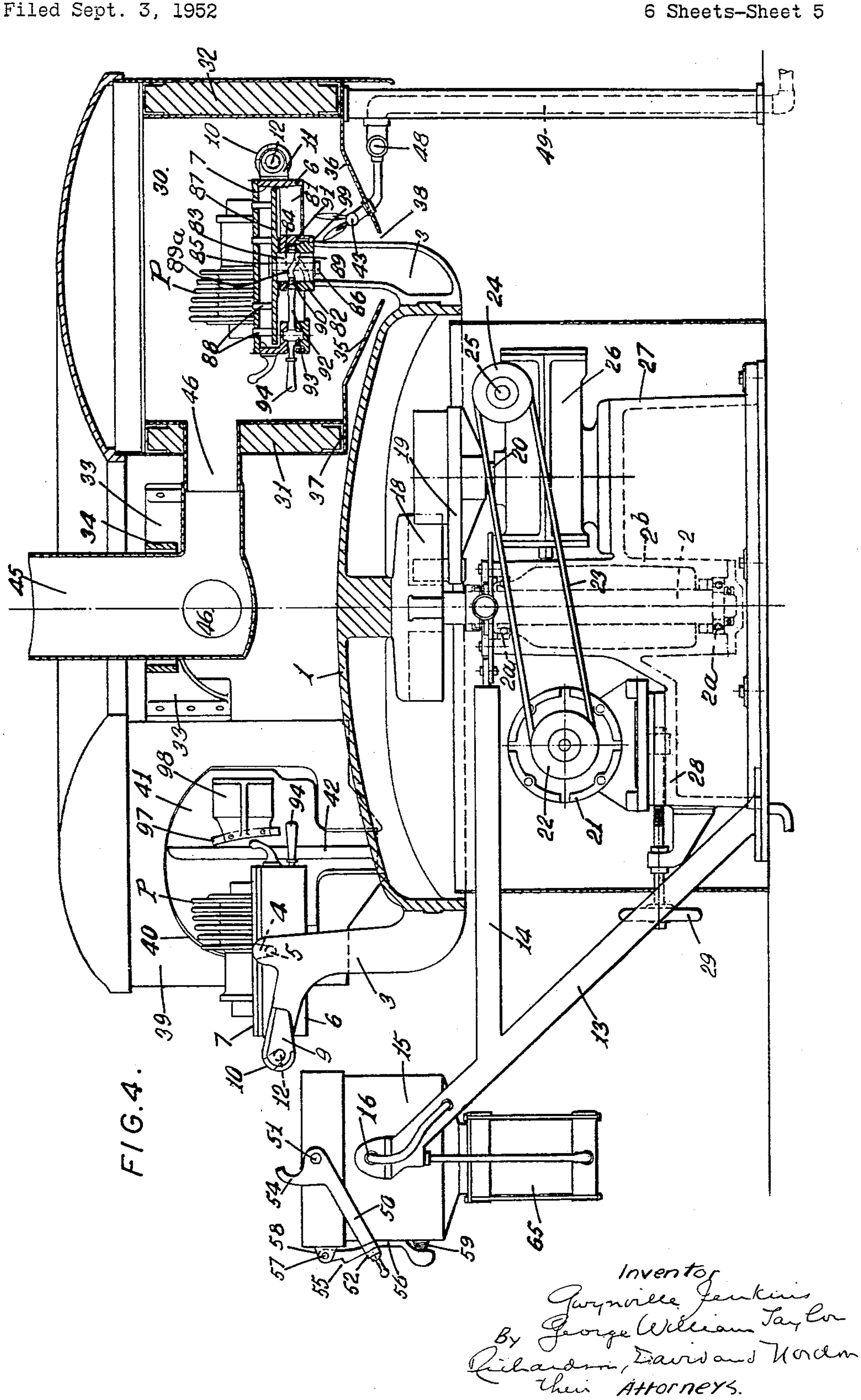
Figures 5, 6, 7:
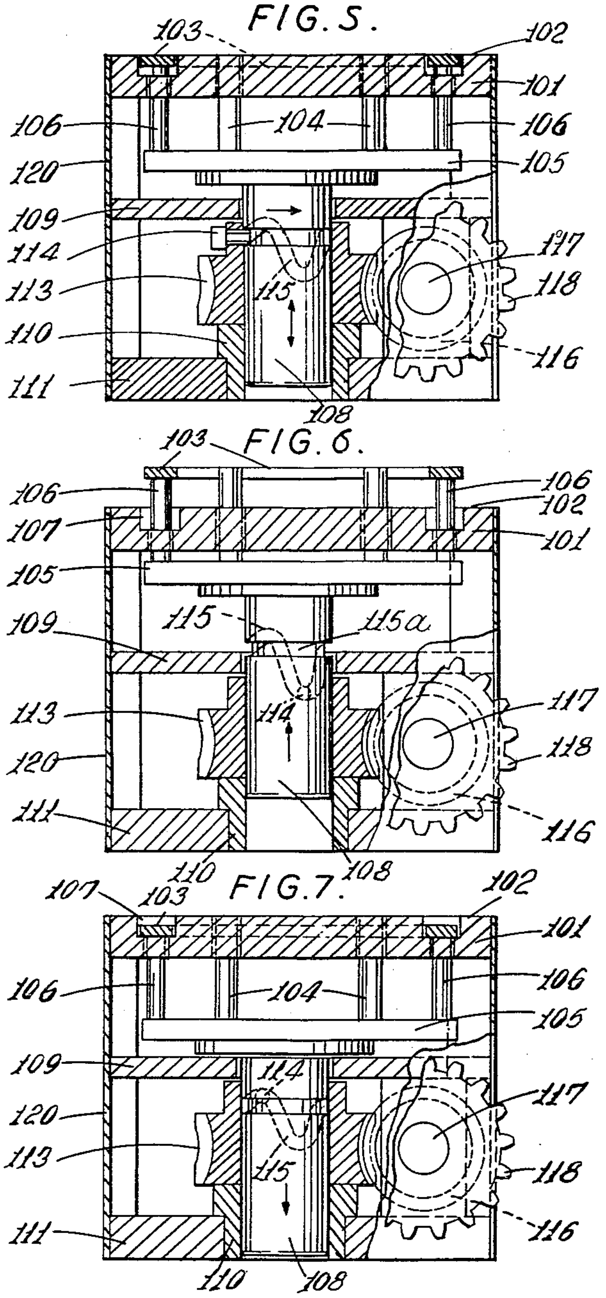

In order to explain the invention more fully two embodiments thereof will now be described by way of example with reference to the accompanying diagrammatic drawing in which:

Figure 1 is a right hand side elevation of one form of apparatus showing the mixture container in section, Figures 2A and 2B together form a plan in section on the line II—II in Figure 1, Figure 3 is a front elevation, Figure 4 is a right hand side elevation partly in section, Figure 5 shows an alternative construction according to the invention in vertical section with the ejecting means in the normal position, Figure 6 is a view similar to that of Figure 5 showing the ejecting means projected out of the pattern plate, and Figure 7 is a further view similar to that of Figure 5 showing the ejecting means in the retracted position.

In this embodiment the apparatus comprises a rotatable table 1 of circular form attached to a vertical shaft 2 and carrying four pairs of upstanding arms 3, such pairs of arms being disposed at 90° apart around the edge of the table. The shaft 2 is supported in bearings **2*a* housed in a pedestal 2*b***.

Considering one pair of arms 3, each arm has an upwardly open slot 4 at its outer end with which engages a respective trunnion pin 5 projecting laterally from a frame 6 to which a pattern carrying plate (hereinafter referred to as a pattern plate) can be attached. The pattern plate 7 rests on the top of the frame 6 and is removably attached thereto by screws 8 so that the pattern plate can be removed from the frame 6 and replaced by another.

Each of the arms 3 also has a radially outwardly projecting arm 9 in the end of which is formed an upwardly open slot 10 which is outwardly inclined.

The frame 6 carries at its outer side two bosses 11 each carrying an outwardly projecting trunnion pin 12 which trunnion pins rest in the slots 10. Thus each of the frames 6 is normally supported by two pairs of trunnion pins, the pins 5 of one pair engaging with the upwardly open slots 4 while the pins 12 rest in the upwardly open slots 10.

By this means, for a purpose to be explained later, the frames 6 can be swung radially outwards through 180° about the axis of the pins 12 and then swung back again through 180° to the rest position in which the pins 5 come to rest in the slots 4.

Inclined upwardly and outwardly from the base of the machine are frame members 13 which are tied to the upper end of the pedestal 2$^{b}$ by radical frame members 14 and two of the frame members 13 support between them on their upper ends a bin 15 for moulding mixture.

The bin 15 carries laterally extending trunnion pins 16 which engage in holes in the upper ends of the members 13 so that in the manner explained later the bin can be inverted through 180° in the vertical plane, the bin being normally vertical with its mouth at the top.

Secured to the shaft 2 is one element 18 of a Geneva mechanism of which the other element 19 is secured to a shaft 20 driven from an electric motor 21 through the pulley 22, belt 23 and pulley 24. The pulley 24 is attached to the input shaft 25 of a double worm reduction gear 26 of which shaft 20 is the output shaft.

The gear box 26 is supported on a mounting 27 in the base of the machine and the motor 21 is supported on a similar mounting 28.

The pulleys 22 and 24 are of the variable speed type and speed control is obtained by the hand-wheel 29.

The Geneva mechanism is constructed so that a pre-determined dwell occurs in the rotation of the table 1 at every one-quarter revolution.

Mounted above the rotatable table 1 is an oven 30 of arcuate form, such oven extending round three-quarters of the periphery of the table 1, so that one-quarter of such periphery is left open. The bin 15 is mounted opposite to this open section and is disposed symmetrically with respect thereto.

It is here pointed out that there may be more than four pairs of arms 3 each supporting a pattern plate carrier 6 and assuming that the number of pairs of arms is $n$ then the Geneva mechanism would be arranged to produce a dwell in the rotation of the table 1 at each $1/n$th of a revolution. In such cases the oven would extend around $$\frac{n-1}{n}$$

of the periphery of the table.

The oven 30 comprises inner and outer arcuate concentric walls 31 and 32, said walls being hollow and having the space within them filled with heat-insulating material. The outer wall 32 is supported by the members 13 while the opposite faces of the inner wall 31 are tied together by ribs 33 extending radially from a central ring 34 through which passes a flue 45 connected by pipes 46 to the oven.

The bottom of the oven is formed by two arcuate plates 35 and 36, of which plate 36 is attached to members 13, while plate 35 is attached to the lower edge of the inner wall 31 of the oven by brackets 37. The plates 35 and 36 are formed to leave an arcuate slot 38 between them for the passage of the arms 3 as the table 1 rotates.

At each end of the oven is provided a closure 39 and 39[a] respectively, each of which is formed with an opening 40 and 40[a] respectively to admit the pattern plate carriers 6 as they move round with the table.

Midway between consecutive pairs of arms 3 the rotatable table 1 carries a plate 41 having substantially the same shape as that of the apertures 40 and 40[a], each plate being mounted on a post 42 attached to the periphery of table 1. The spacing of the plates 41 in relation to the arms 3 is such that when one pair of arms 3 with its pattern plate carrier 6 is positioned opposite to the bin 15 the aperture 40 in the entry end of the oven is closed by one of the plates 41 while the aperture in the exit end of the oven is closed by the next following plate 41, which is at 90° to it.

The arrangement of the Geneva mechanism is such that at each dwell one pair of arms 3 presents its pattern carrying support 6 in co-operative relation to the bin 15 while the remaining pairs of arms with their pattern plate supports are stationary within the oven, the apertures in which are closed by the plates 41.

The oven may be heated by gas burners 43 disposed within it below the path of the pattern plate carriers 6 as they pass through it, said burners 43 projecting inwardly from an arcuate pipe 48 extending around the oven and fed with gas from supply pipe 49. Alternatively, it may be heated by electrical means if desired.

Each pattern plate carrier 6 is provided with means, which will be described later, for ejecting a finished mould from its pattern plate, such ejection taking place as the pattern plate approaches the exit from the oven.

In using the apparatus, the heating means for the oven is started up, for example, by igniting the burners 43 or switching on the electric supply in the case of electrical heating, and the rotatable table 1 is set in rotation and allowed to continue to rotate for a sufficient time to heat up the pattern plates by repeated passage through the oven.

During this operation, the Geneva mechanism will cause each pattern to remain stationary opposite the bin 15 for a pre-determined interval of time during each revolution.

If desired, in order to save time during this pre-heating operation, means may be provided for cutting out action of the Geneva mechanism so that the rotation is continuous.

After the pattern plates have been passed through the oven for sufficient time for them to attain the working temperature, the mould producing operation is commenced in the following manner:

The pattern plate carrying frame 6 which for the time being is stationary opposite to the mixture-containing bin 15 is first coated with stripper material and is then swung outwardly about its outer trunnion 12, this operation bringing the pattern carrying frame 6 and pattern plate 7 on to the top of the bin 15 in an inverted position so that the pattern P projects downwardly into the bin.

For this purpose the bin is so positioned in relation to the outermost pivots 12 of the pattern carrier 6 that when the latter is thus swung outwardly through 180° it comes to rest in a position in which it fits over the open mouth of the bin.

The bin 15 carries means for clamping the pattern plate carrier 6 thereto. For this purpose, two arms 50 are pivoted at 51 to the upper part of bin 15, these arms being connected by a locking bar 52 extending across the front of the bin 15. Each arm 50 carries a hook 54 which in the clamping position embraces the respective pin 5 on the inverted carrier 6, the arms 50 being locked in the clamping position by the engagement of the locking bar 52 over shoulder 55 on a release arm 56 pivoted at 57 between lugs 58 on the front of the bin. The arm 56 is urged outwardly by spring 59 and in order to release the clamping mechanism the arm 56 is pressed inwardly so that its shoulder 55 passes through below the locking bar 52, which can then be rocked downwardly about its pivots 51 to disengage the hooks 54 from the pins 5.

When the bar 52 is returned upwardly to clamping position the spring 59 rocks the arm 56 outwardly to bring its shoulder 55 below the bar 52 to lock the latter. The bar 52 is provided with an actuating handle shown at 60.

Attached to the lower end of the bin 15 is a cylinder 65 containing a piston (not shown) of which the rod 67 extends through the bottom of the bin and carries a plunger 68 movable freely within the bin. The normally upper face of said plunger carries a resilient pad or mat 69 which may be of sponge rubber or of other resilient nature.

Plunger 68 is attached to piston rod 67 by a universal joint constructed as follows. The upper end of rod 67 is screwthreaded and has screwed on to it a ball 75 which is partially embraced by a hemispherical socket in the plunger 68, and held in place by a ring 76 shaped internally to fit the ball and secured to the plunger 68, a corrugated annular sealing element 77 being provided to prevent moulding mixture from reaching the ball.

As already stated the bin 15 is mounted on the trunnions 16 for inversion and in order to supply compressed air to the cylinder 65, one of the bin trunnions 16 is made hollow and an air line 70 is connected to said trunnion and thence through pipes 71 and 72 to the upper and lower ends of the cylinder respectively.

Manually or foot operated control valves, not forming part of the invention (and not shown), are provided for permitting compressed air to be admitted to one side of the piston and exhausted from the other side thereof or vice versa as required by the operator.

After the pattern plate carrier has been clamped to the top of the bin in the inverted position as described above, the bin itself is inverted by turning it through 180° about its trunnions 16 whereby the moulding mixture contained within the bin falls under the action of gravity around the pattern P.

Compressed air is now admitted through pipes 70 and 72 to the normally lower end of cylinder 65 (which is now upper-most) and the ram 68 is forced downwardly towards the pattern thereby forcing the mixture into intimate contact with the pattern under pressure.

During the application of this pressure, the resilient pad or mat 69 assists in producing the desired intimate contact of the mixture with the configuration of the pattern P.

It is further pointed out that at the commencement of the inversion movement of the bin 15, the pins 12 carried by the pattern plate carrier 6 are free to leave the slots 10 owing to the shape and inclination of the latter.

After the pressure has been maintained for the desired time, usually about 5 to 8 seconds, depending upon the thickness of the coating which it is desired to produce on the pattern, the plunger 68 is raised, by reversing the air supply to the cylinder 67 and the bin is righted by swinging it through 180° in the reverse direction, at the end of which movement the trunnion pins 12 on the pattern carrier 6 re-engage the slots 10. When the plunger is raised, it is adjusted to the horizontal position by engagement of the ring 76 with a re-setting ring 78 attached to the top of the cylinder. The release arm 56 is then pressed inwardly and the handle 60 is depressed to move the clamping hooks 54 from the pins 5.

The pattern carrier 6 is then swung inwardly about the trunnions 12 through 180° until its trunnions 5 re-engage the slots 4 in the arms 3.

The operations of attaching the pattern carrier 6 the bin 15, inverting the latter, applying pressure, righting the bin and re-attaching the pattern carrier to the rotatable table 1 are performed by the operator in the period of time during which the rotatable table is stationary.

After the pattern carrier has been re-attached to the rotatable table the latter performs another quarter of a revolution during which the coated pattern passes into the oven 30 and at the end of which the second pattern carrier is brought into position opposite the bin.

The second pattern plate is then coated with the separating substance or stripper, and a coating of moulding mixture is applied thereto in the manner described above, after which the second pattern plate is re-attached to the rotatable table.

The rotatable table 1 now performs another quarter of a revolution thereby moving the first pattern plate farther into the oven and moving the second pattern plate into the oven, and bringing the third pattern plate into position opposite the bin.

The operations involved in forming a coating of moulding material on the third pattern plate are then carried out as described for the first pattern plate and the rotatable table 1 performs another quarter of a revolution thereby causing the third pattern plate to enter the oven, and moving the first and second pattern plates farther into the oven while, at the same time, the fourth pattern plate is brought into position opposite the bin.

A coating of moulding mixture is then formed on the fourth pattern plate in the manner already described and the rotatable table 1 performs a further quarter revolution thereby completing one revolution. During this last quarter of a revolution the first pattern plate with its coating now cured by passage through the oven, is brought out of the oven and brought into position opposite the bin 15, while the second and third pattern plates are moved farther into the oven and the fourth pattern plate is caused to enter the oven.

The cured coating constituting the mould is now removed from the first pattern plate, and the latter is coated with a lubricant or stripper material and is then employed as described above for the purpose of forming another coating thereof.

Thereafter, at each dwell in the rotation of the table 1 a finished mould is removed from the pattern plate which is opposite to the bin 15 and a fresh coating of moulding mixture is formed thereon, while the remaining three pattern plates are within the oven.

In order to permit the removal of the finished moulds from the pattern plates 7 each pattern plate carrier 6 has incorporated in it a mechanism for ejecting the mould from the associated pattern plate. In the centre of the frame 6 is a ring 80 connected to the sides of the frame by radiating ribs 81, and, in a bearing 82 in the ring a sleeve 83 is mounted for vertical sliding movement, while being restrained against rotary motion.

Passing through the sleeve 83 is a bolt 84 having a head 85 and a nut 86, by means of which an ejector pin supporting plate 87 is attached to the sleeve 83 for movement therewith. The plate 87 carries a number of ejector pins 88 which pass through corresponding holes in the pattern plate 7.

The plate 87 is normally positioned so that the free ends of the pins 88 are slightly above the working surface of the pattern plate 7. In the manner described below the plate 87 can be moved to effect movement of the pins 88 such that they are first retracted and then projected out of the working surface of the pattern plate 7 and thereby eject the mould from the pattern plate.

To this end the sleeve 83 is formed with a cam groove 89 with which engages a pin 90 projecting internally from a toothed ring 91 freely mounted about the sleeve 83.

Engaging with the teeth of the ring 91 is a toothed quadrant 92 pivoted at 93 in the frame 6. This quadrant carries an arm 94 extending through a slot in the wall of the frame 6. Fixed in the path of the arm 94 of each quadrant 92 as the associated frame 6 moved round with the table 1 is a cam 95, this cam 95 being positioned so that as each carrier frame 6 leaves the oven 30 its arm 94 engages the cam 95 and rocks the quadrant 92 to rotate the toothed ring 91. By this means, owing to the engagement of the pin 90 with the cam groove 89 the sleeve 83 is urged upwardly, taking with it the plate 87 and the pins 88, which are thereby projected out of the pattern frame 7 and thus effect ejection of the mould. In this way when the pattern plate arrives at the investment station opposite to the bin 15 the mould is simply resting on the pattern plate and can be readily removed by the operator.

The ejector mechanism may be re-set by hand after removal of the mould and to this end the arm 94 is made in the form of a handle but preferably such re-setting is effected automatically by the movement of the pattern plate carrier 6 through 180° from its normal rest position to its inverted position over the mouth of the bin 15.

In order to effect this automatic re-setting of the ejector mechanism, a re-setting track 97 is so positioned relatively to the pattern plate carrier 6 that as the latter is swung outwardly through 180° to bring it on the top of the bin 15, the arm 94 engages the track 97 and is thereby turned back to its original position to re-set the ejector mechanism.

There is a re-setting track 97 for each arm 94 and each re-setting track is attached to the adjacent closure plate 41 by a bracket 98.

When a pattern plate 7 is replaced it is necessary also to replace the ejector plate 87 by another carrying pins 88 positioned to co-operate with the corresponding holes in the new pattern plate 7. This can be effected by removing nut 86, withdrawing the bolt 84 upwardly and then removing the plate 87, the bolt 84 and nut 86 being replaced after the new ejector plate 87 has been placed in position on top of sleeve 83.

To permit insertion of ring 91, the lower part of bearing 82 is detachable, being attached to its upper part by screws 99.

When the toothed ring 91 is turned to effect ejection its pin 90 first passes along the hump 89*a* in the cam groove 89 whereby the ejector pins are withdrawn below the surface of plate 7, after which the pin 90 passes along the remainder of groove 89 to project the pins 90 out of the surface of plate 7.

In the construction shown in Figures 5 to 7 the apparatus comprises a pattern plate 101 having a working surface 102 to which patterns may be attached by any convenient means. Alternatively, the pattern may be formed integrally with the pattern plate 101.

The ejecting means comprises a rectangular frame 103 and four ejector pins 104, the latter projecting from a supporting plate 105, while the frame 103 is mounted on supporting pins 106 carried by the support 105.

The pattern plate 101 is counter-sunk at 107 to receive the rectangular ejector frame 103 and is formed with holes through which pass the ejector pins 104.

The supporting plate 105 is carried by a shaft 108 slideable in a plate 109 and in a bushing 110 fixed in a base plate 111 of a frame having side members 120 and of which the top is formed by the pattern plate 101.

Freely mounted about the shaft 108 is a worm wheel 113 carrying a pin 114 which engages in a cam groove 115 formed in the shaft 108 and engaging with the worm wheel 113 is a worm secured to a shaft 117 of which is also secured externally to the apparatus a driving pinion 118.

The cam groove has a portion 115*a* concentric with shaft 113 so that while the pin 114 is in engagement with the cam part 115*a* no reciprocation of shaft 108 occurs.

During coating of the pattern plate 101 with moulding material, the parts are in the position shown in Figure 5 in which the ejector frame 103 and pins 104 are flush with the working surface of the pattern plate 101.

When it is required to strip a mould from the pattern plate, the shaft 117 is rotated thereby rotating worm wheel 113 so that pin 114 travels along the cam groove 115*a*, 115, and after a dwell pulls the shaft 108 downwardly by a relatively short distance thereby retracting the plate 103 and pins 104 below the surface of pattern plate 101 to the position shown in Figure 7, whereby the moulded article is freed from the ejector plate 103 and pins 102.

Further rotation of wheel 113 causes pin 114, by engagement with cam groove 115, to lift the shaft 108 to the position shown in Figure 6, whereby the ejector plate 103 and pins 104 are projected out of the pattern plate 101 to eject the moulded article therefrom.

A complete revolution of wheel 113 produces a complete cycle of operations of the ejector elements 103, 106, so that after one ejection operation, the parts are returned to the starting position and are in readiness for the next ejection operation, which is effected by a further one revolution of the wheel 113 in the same direction as before.

The unit shown in Figures 5 to 7 corresponds to the pattern carrier 6 described above with reference to Figures 1 to 4, and the pattern plate 101, together with ejector plate 105 and ejector elements 103, 104 may be removable from the unit. Thus plate 105 may be attached to shaft 108 by a screw passing centrally through plate 105 and axially into shaft 108. Alternatively shaft 108 may be hollow, and the plate 105 attached thereto by a through bolt in the same manner as that in which plate 81 is attached to sleeve 83.

Further the upper part of the frame 120 may be constructed so that the pattern plate 101 seats on the top edges of said frame and can be removably attached thereto by screws, in the same way as that in which the pattern plate 7 is attached to its carrier frame 6.

The frame 120 may be provided with trunnions such as the trunnions 5 and 12 in Figure 4 so that it may be used in apparatus of the form described with reference to Figure 1 to 4. In that case a fixed rack of curved form may be positioned in the path of the pinion 118 as the frame 120 travels round with the table 1, from the oven 30 to the investment station.

In such construction the rotation of pinion 118 by the passage of the device past the fixed rack may perform the ejection operation only, leaving the ejector elements projecting beyond the working surface of the pattern plate.

After removing the mould, the operator coats the pattern and pattern plate with a stripper material such as a solution of a wax to prevent the next mould from adhering too firmly to the pattern.

By leaving the ejector elements projecting from the working surface of the pattern plate, cleaning of the ejector elements is facilitated and the operation of coating the pattern plate with the stripper material also effects lubrication of the ejector elements. The latter can then be retracted by manual operation of the mechanism.

We claim:

1. Apparatus for making hollow articles by applying to a heated pattern a moulding mixture comprising a pulverulent material and a hardenable synthetic resin in powder form to form a coating on the pattern, and curing said coating by heat, said apparatus comprising a horizontal rotatable table, a plurality of pattern carriers spaced at equal intervals around the periphery of said table, each of said carriers being hinged to said table for radially outward swinging movement in a vertical plane, and each of said carriers including means for ejecting a cured coating from a pattern, and an element for actuating said ejector means, said actuating element being movable in one direction to operate the ejector means to perform ejection and in the opposite direction to reset the ejector means, an oven of arcuate form extending around a part of the table in the path of the pattern carriers, a container for moulding mixture disposed adjacent to the periphery of the table, means for rotating the table intermittently with a dwell each time a pattern carrier arrives opposite the container, whereby said carrier can be swung radially outwards about its hinges to position it over the mouth of the container with the pattern inverted within the latter, a fixed cam member disposed in the path of the ejector actuating element as the latter travels from a point within the oven to the container, said cam member serving to effect the ejecting movement of the ejector actuating element, and a cam track disposed in the path of the ejector actuating element during the radially outward swing of the pattern carrier, said cam track serving to effect the resetting movement of the ejector actuating element.

2. Apparatus for use in moulding hollow articles by applying, to a heated pattern, a moulding mixture comprising a pulverulent material and a hardenable synthetic resin in powder form to form a coating on the pattern, and curing said coating by heat, said apparatus comprising a frame open on one face, an ejector element support mounted within said frame for reciprocation towards and away from said open face thereof, said ejector element support comprising a cylindrical member formed with a cam track extending around its periphery, said cylindrical member being embraced by a rotatable ring carrying an inwardly directed pin engaging in said cam track and means for rotating the ring to effect reciprocation of the cylindrical member, ejector elements on said support, said ejector elements projecting towards said open face of the frame and means for attaching a pattern carrying plate to said frame over the open face thereof with holes in said plate in registration with the ejector elements.

3. Apparatus for use in moulding hollow articles by applying, to a heated pattern, a moulding mixture comprising a pulverulent material and a hardenable synthetic resin in powder form, to form a coating on the pattern, and curing said coating by heat, said apparatus comprising a frame open on one face, an ejector element support mounted within said frame for reciprocation towards and away from said open face thereof, said ejector element support comprising a cylindrical member formed with a cam track extending around its periphery, said cylindrical member being embraced by a rotatable ring carrying an inwardly directed pin engaging in said cam track, ejector elements in said support, said ejector elements projecting towards said open face of the frame and means for attaching a pattern carrying plate to said frame over the open face thereof with holes in said plate in registration with the ejector elements, said cam track being so shaped that one revolution of the ring effects, firstly, retraction of the ejector elements below the surface of the heated pattern, secondly, movement of said ejector elements in the opposite direction to a greater extent to perform an ejection operation and finally withdrawal of said ejector elements to their normal position.

4. Apparatus for use in moulding hollow articles by applying, to a heated pattern, a moulding mixture comprising a pulverulent material and a hardenable synthetic resin in powder form, to form a coating on the pattern, and curing said coating by heat, said apparatus comprising a frame open on one face, an ejector element support mounted within said frame for reciprocation towards and away from said open face thereof, said ejector element support comprising a cylindrical member formed with a cam track extending round its periphery, said cylindrical member being embraced by a rotatable ring carrying an inwardly directed pin engaging in said cam track, means for rotating the ring to effect reciprocation of the cylindrical member, ejector elements on said support, said ejector elements projecting towards said open face of the frame, means for attaching a pattern carrying plate to said frame over the open face thereof with holes in said plate in registration with the ejector elements, said cam track being so shaped that rotation of the ring in one direction effects, firstly, retraction of the ejector elements below the surface of the heated pattern, and secondly, movement of said ejector elements in the opposite direction to a greater extent to perform an ejection operation, the return of the ejector elements to their normal position being effected by reversal of the movement of the ring.

5. Apparatus for use in moulding hollow articles by applying, to a heated pattern, a moulding mixture comprising a pulverulent material and a hardenable synthetic resin in powder form, to form a coating on the pattern, and curing said coating by heat, said apparatus comprising, in combination, a carrier, a flat surfaced pattern support mounted on said carrier and having a recess in its flat surface, a flat surfaced ejector element movable in said recess to a position in which the flat surface of the ejector element is flush with the flat surface of the pattern support and to a position in which the ejector member projects from the flat surface of the pattern support to perform an ejection operation, ejector pins secured to said flat surfaced ejector element, a supporting plate for the ejector pins, a base plate attached to said carrier, a shaft carrying the supporting plate and capable of rotation and reciprocation in said base plate, a cam track on the periphery of the shaft, a fixed pin engaging the cam track, and means for rotating the shaft to effect said movement of the ejector element.

6. Apparatus for use in moulding hollow articles by applying, to a heated pattern, a moulding mixture comprising a pulverulent material and a hardenable synthetic resin in powder form, to form a coating on the pattern, and curing said coating by heat, said apparatus comprising a frame open on one face, an ejector element support mounted within said frame for reciprocation towards and away from said open face thereof, said ejector element support comprising a cylindrical member formed with a cam track extending around its periphery, said cylindrical member being embraced by a rotatable ring carrying an inwardly directed pin engaging in said cam track and also outwardly directed teeth, a toothed quadrant pivotally mounted in said frame, the teeth on said quadrant meshing with the teeth on said rotatable ring, a projecting member on said quadrant, displacement of said projecting member producing pivotal movement of said quadrant and thereby producing rotation of said rotatable ring to effect reciprocation of the cylindrical member, an ejector element operatively connected with said cylindrical member and projecting toward said open face of the frame, said ejector element being reciprocated together with said cylindrical member, and means for attaching to said frame over the open face thereof a pattern carrying plate provided with a hole in registration with the ejector element.

7. Apparatus according to claim 3 wherein said rotatable ring is formed with outwardly directed radial teeth, said apparatus further including a quadrant pivotally mounted in said frame and provided with outwardly directed radial teeth for engagement with the teeth of said ring, said quadrant having a member projecting through said frame, whereby displacement of said projecting member produces pivotal movement of said quadrant and rotation of said rotatable ring.

8. Apparatus for use in moulding hollow articles by applying, to a heated pattern, a moulding mixture comprising a pulverulent material and a hardenable synthetic resin in powder form, to form a coating on the pattern, and curing said coating by heat, said apparatus comprising in combination a carrier, a flat surfaced pattern support mounted on said carrier and having a recess in its flat surface, a flat surfaced ejector element movable in said recess to a position in which the flat surface of the ejector element is flush with the flat surface of the pattern support and to a position in which the ejector member projects from the flat surface of the pattern support to perform an ejection operation, ejector pins secured to said flat surfaced ejector element, a supporting plate for the ejector pins, a shaft carrying the supporting plate and capable of rotation and reciprocation in a base plate attached to the carrier, a cam track on the periphery of the shaft, a fixed pin engaging the cam track, a pinion on said shaft, a worm wheel meshing with said pinion and mounted on a shaft carrying a further pinion, and a rack engageable by said further pinion such that relative movement between the rack and the pinion causes reciprocation of the shaft.

References Cited in the file of this patent

UNITED STATES PATENTS

| | | |
|---|---|---|
| 1,533,649 | Hopkins | Apr. 14, 1925 |
| 2,566,817 | Yellin | Sept. 4, 1951 |
| 2,659,945 | Valyi | Nov. 24, 1953 |
| 2,695,431 | Davis | Nov. 30, 1954 |

FOREIGN PATENTS

| | | |
|---|---|---|
| 832,936 | Germany | Mar. 3, 1952 |

OTHER REFERENCES

The Iron Age, April 19, 1951, pages 81–85.

Fortune, July 1952, pages 104, 105, 106, 140, 143.